Figure 1:
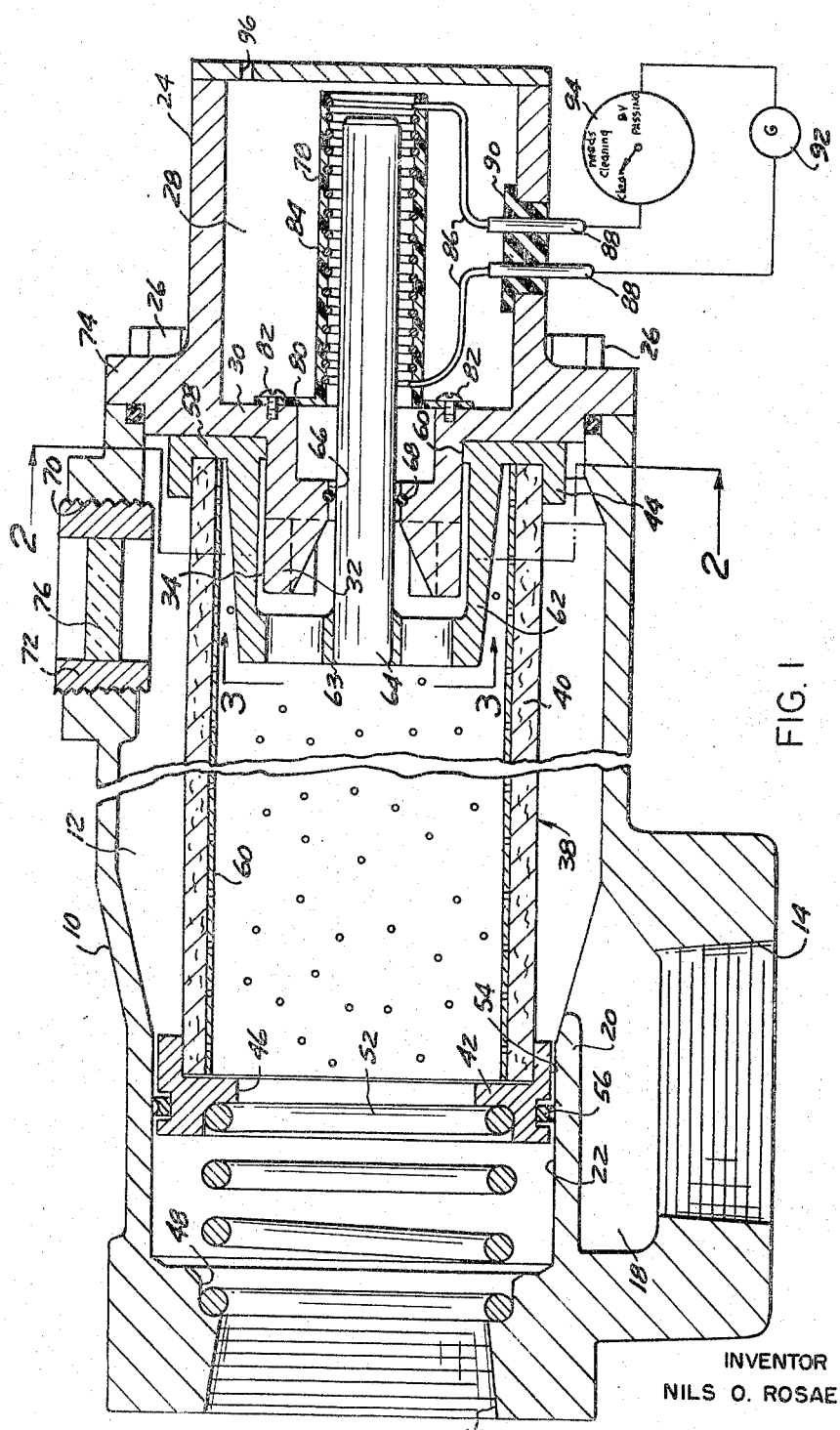

INVENTOR
NILS O. ROSAEN
BY Hauke & Hauke
ATTORNEYS

United States Patent Office 3,323,649
Patented June 6, 1967

3,323,649
FILTER DEVICE AND ELECTRICAL INDICATING MEANS
Nils O. Rosaen, Bloomfield Hills, Mich., assignor to The Rosaen Filter Company, Hazel Park, Mich., a corporation of Michigan
Filed Feb. 14, 1966, Ser. No. 527,202
7 Claims. (Cl. 210—90)

The present invention relates to filter devices or the like and more particularly to a new means for indicating the condition of the filter element of such devices.

Heretofore, filter devices have been provided with mechanical means for indicating the condition of the filter element. These have usually taken the form of a member movable in response to changes in the pressure differential across the filter element and means for indicating the changes in the position of the movable member. Since the pressure differential across the filter element will vary in accordance with the degree of clogging, this provides a means for indicating the condition of the filter element. The problem with such indicating means is that the indicator must be positioned relatively near the filter device and is in most instances disposed on the exterior surface of the filter housing itself. This prevents the provision of a central control area at which indicators from several filter devices can be located and conveniently checked.

Filter devices with electrically actuated indicators have also been heretofore provided. Electrical actuation permits the indicators to be positioned remote from the filter device and thus permits the provision of a central control area for several filter devices. Generally, however, such heretofore provided electrical actuating means have been in the form of an electrical switch actuated between an "on" and "off" position by a movable member responding to changes in the pressure differential across the filter element. Thus such electrical actuating means provides an indication only when the filter element reaches a predetermined clogged condition and does not indicate the filter condition over a full range so that the filter element can be changed at some convenient time prior to complete clogging.

The present invention provides a filter device having an electrically actuated indicating means. This permits the indicator to be located at any convenient point remote from the filter device to which it is connected. In place of the usual "on" and "off" switch, the actuating means of the present invention utilizes a core formed of a magnetic material movable in response to changes in the pressure differential across the filter element. The core is movable axially within a choke coil which is electrically connected in series with a source of alternating current and a conventional volt meter. The movement of the core within the coil produces a variance in the inductance of the coil which depends upon the position of the core and thus the condition of the filter element. The condition of the filter element will thus be indicated by providing proper indicia on the scale of the volt meter.

It is an object then of the present invention to improve filter devices and the like by providing a new indicating means for such devices.

It is another object of the present invention to accurately indicate the position of an axially movable member by providing an electric circuit including a volt meter and a source of alternating current and means varying the inductance within the electric circuit in response to changes in the position of the movable member.

It is another object of the present invention to provide means for indicating the condition of a filter element at a position remote from the filter device by providing a core member movable in response to changes in the pressure differential across the filter element, a choke coil disposed about the movable core and connected in series with a source of alternating current so that movement of the core member produces a variance in the inductance of the coil to thereby indicate the condition of filter element.

Figure 2:
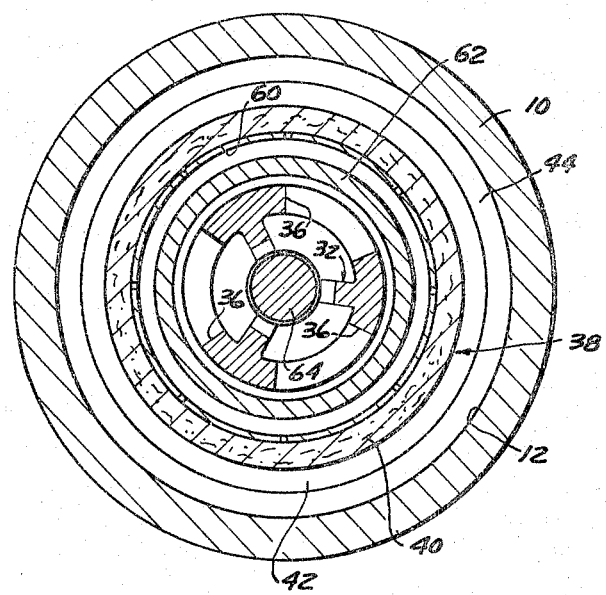
Figure 3:
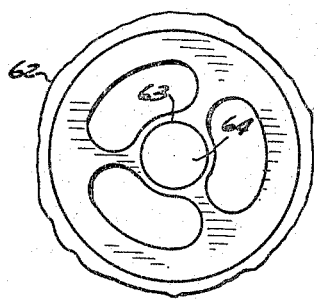

Still further objects and advantages of the present invention will be readily apparent to one skilled in the art to which the invention pertains upon reference to the following description. The description makes reference to the accompanying drawings in which like reference characters refer to like parts throughout the several views and in which FIG. 1 is a longitudinal cross sectional view of a filter device embodying the indicating means of the present invention and illustrating portions of the indicating means schematically, FIG. 2 is a cross sectional view taken substantially on line 2—2 of FIG. 1 but reduced somewhat, and FIG. 3 is a cross sectional view taken substantially on line 3—3 of FIG. 1.

Now referring to the drawings for a more detailed description of the present invention, a preferred filter device is therein illustrated as comprising a substantially cylindrical filter housing 10 defining a filter chamber 12 and having an inlet 14 opening radially to the chamber 12 and an outlet 16 at one end opening axially to the chamber 12. The inlet 14 opens to the chamber 12 through an arcuate chamber 18 which is in part formed by an interior arcuate wall section 20 of the housing 10.

The interior surface of the wall section 20 is integrally and smoothly joined with the inner surface of the housing 10 forming the chamber 12 to define a cylindrical guide surface 22 at the outlet end of the chamber 12 formed on a smaller diameter than the remainder of the chamber 12.

A cap member 24 closes the end of the chamber 12 opposite the outlet 16 and is mounted to the end of the housing 12 by a plurality of annularly spaced screws 26. The cap member 24 extends axially from the end of the housing 10 to form a chamber 28 separated from the chamber 12 by an inwardly extending portion 30 of the cap member 24.

As can best be seen in FIG. 2, the portion 30 is formed with a central boss 32 which extends axially into the chamber 12. The boss 32 is preferably hollow and formed with a substantially cylindrical outer surface 34. Portions of the boss 32 are removed to form a plurality of annularly spaced slots 36 extending axially from the inner end of the boss 32 and terminating short of the portion 30.

The guide surface 22 formed at the outlet end of the chamber 12 and the surface 34 of the boss 32 form the means for axially slidably positioning a filter assembly 38 within the chamber 12. The filter assembly 38 preferably comprises a substantially cylindrical filter element 40 sandwiched between caps 42 and 44. The cap 42 is provided with a central opening 46 connecting the interior of the filter element 40 with the outlet 16. The housing 10 is provided with a recess 48 concentric with the outlet 16 and the cap 42 is provided with a similar recess 50. The recesses 48 and 50 provide the means for retaining a spring 52 which urges the filter assembly 38 axially against the inner surface of the cap member 24. A cylindrical outer surface 54 of the cap 42 carries a piston ring 56 which engages the guide surface 22 to permit the filter assembly 38 to move axially along the guide surface 22 without permitting fluid to flow therepast.

The cap 44 as can best be seen in FIG. 1, is provided with a circular portion 58 having a central opening 60. The surface forming the central opening 60 axially slidably engages the boss 32 so that the filter assembly 38 is movable along the surface 34. The cap 44 further comprises a hollow substantially cylindrical extension 62 extending axially into the interior of the filter element 40 and normally encompassing the boss 32. A circular plate 63 is integrally joined with the interior end of the extension 62 and provides the means for carrying an axially outwardly extending rod 64. The rod 64 extends through a central opening 66 provided in the boss 32 and into the chamber 28. An O-ring seal 68 carried by the boss 32 engages the rod 64 to prevent fluid leakage from the chamber 12 along the rod 64 and into the chamber 28.

The housing 10 may if preferred be provided with a threaded opening 70 for receiving a plug 72 having a centrally disposed sight glass or clear plastic member 76. The plug 72 is preferably disposed to permit visual inspection of the chamber 12 in an area adjacent the boss 32.

As the filter device has thus far been described, fluid is normally directed through the inlet 14 radially inwardly through the filter element 40 axially through the opening 46 to the outlet 16. As the filter element 40 becomes clogged, the pressure differential across the element will increase. This increased pressure differential is also present across opposed surfaces of the caps 42 and 44 so that when the pressure differential increases to a value sufficient to overcome the spring 52, the filter assembly 38 will move axially from the position shown in FIG. 1 away from the cap member 24. It is apparent then that the filter assembly 38 will always assume an axial position within the filter chamber 12 which is dependent upon the condition of the filter element 40. When the filter assembly 38 has moved axially sufficiently to bring the cap 44 past the slots 36 provided in the boss 32, a bypass path will be opened between the inlet side of the filter element 40 through the slots 36 and to the outlet side of the filter element 40. Thus, a fluid path is opened bypassing the filter element 40 when the element becomes unduly clogged.

It is apparent that a filter device has been described in which filter assembly 38 including the rod 64 will move axially within the chambers 12 and 28 respectively in accordance with the condition of the filter element 40. Thus by providing means for indicating the position of the rod 64, a means will also be provided for indicating the condition of the filter element 40.

The indicating means of the present invention will now be described and preferably comprises a hollow cylindrical member 78 mounted to the portion 30 of the cap member 24 by a flange 80 and screws 82 and extends axially into the chamber 28. The rod 64 extends axially into the interior of the cylindrical member 78 to thereby be encompassed along at least a portion of its length by a coil 84 carried on the interior surface of the cylindrical member 78. The cylindrical member 78 is constructed of any suitable electrical insulating material and opposite ends of the coil 84 are connected by suitable electrical leads 86 connected with terminals 88 carried in an insulating plug 90 mounted in the side of the cap member 24.

The terminals 88 are electrically connected in series with a suitable source of alternating current, such as a generator 92, and a conventional volt meter 94 as shown schematically in FIG. 1.

The coil 84 forms a choke coil in the electrical circuit and the rod 64 is constructed of a suitable magnetic material such as iron so that it forms a core for the choke coil. Thus as the rod 64 is moved axially within the coil 84 in accordance with the condition of the filter element 38, a corresponding variance in the inductance of the coil 84 is produced and by providing suitable indicia on the scale of the volt meter 94, the condition of the filter element 40 will be indicated.

The cap 24 is provided with an opening 96 opening the chamber to atmosphere 28 to aid in movement of the rod 64.

It is apparent that although a particular filter device has been described, this is not important to the invention and other filter devices could be used with the indicating means of the present invention as well, and in fact the indicating means could be, if desired, used to indicate the position of axially movable members in devices other than filter devices. Also, the particular inductance varying means of the indicating means of the present invention could be replaced by other types of inductance varying means.

It is also apparent that although I have described but one embodiment of my invention, other changes and modifications can be made without departing from the spirit of the invention or the scope of the appended claims.

I claim:

1. In a filter device having a filter assembly provided with a filter element and being movable axially in response to changes in the clogged condition of the filter element, means for indicating the condition of the filter element, said means comprising
   (a) an electrical circuit including a source of alternating current,
   (b) a choke coil connected in series with said source of alternating current,
   (c) a magnetic core member connected with said filter assembly and movable therewith within said choke, and
   (d) means connected in series with said core and said coil for indicating the changes in the inductance of said choke coil as produced by changes in the position of said core member to thereby indicate the condition of said filter element.

2. The filter device as defined in claim 1 and in which said core comprises a rod-like extension of said filter assembly.

3. The filter device as defined in claim 1 and in which said source of alternating current comprises a generator.

4. The filter device as defined in claim and in which said last mentioned means comprises a volt meter.

5. The filter device as defined in claim 1 and including
   (a) a housing enclosing said filter assembly and having an opening at one end,
   (b) a cap member closing said opening,
   (c) said coil being carried in said cap member and said core comprising a rod connected with said filter assembly and axially slidably extending through said cap member into said coil.

6. A filter device comprising,
   (a) a housing having a filter chamber and an inlet and an outlet connected to said filter chamber,
   (b) a filter assembly axially slidably carried in said filter chamber and comprising a filter element positioned intermediate said inlet and said outlet,
   (c) said filter assembly further comprising a pressure responsive means having one surface exposed to fluid pressure on the inlet side of said filter element and an opposite surface exposed to fluid pressure on the outlet side of said filter element and being operable to move said filter assembly within said filter chamber in response to changes in the pressure differential across said filter element to thereby move said filter assembly in response to changes in the clogged condition of said filter element,
   (d) indicating means operable to indicate each position of said filter assembly within said filter chamber to thereby indicate the condition of said filter element,
   (e) said indicating means comprising an electric circuit including a source of alternating current, a choke coil mounted in said housing and connected in a series with said source of alternating current, a magnetic core member carried by said filter assembly and movable therewith axially within said choke coil, and means connected in series with said core and said coil for indicating the changes in the inductance of said choke coil produced by the changes in the position of said core member to thereby indicate the condition of said filter element.

7. A filter device as defined in claim 6 and in which
(a) said filter assembly is cylindrical and moves axially in response to said pressure differential changes,
(b) a cap member carried by said housing and closing one end of said chamber,
(c) a hollow cylindrical member mounted to said cap member and extending axially into said chamber,
(d) said choke coil being carried on the interior surface of said cylindrical member and said core member comprising a rod extending coaxially with and from the end of said filter assembly into said cylindrical member.

References Cited

UNITED STATES PATENTS 3,068,700   12/1962   Bourns _____ 73—398
3,080,058   3/1963    Rosaen _____ 210—90

SAMIH N. ZAHARNA, *Primary Examiner.*